US008371909B2

(12) United States Patent
Lowder et al.

(10) Patent No.: US 8,371,909 B2
(45) Date of Patent: *Feb. 12, 2013

(54) SYSTEMS WITH COOPERATING RERUCKERS FOR PRODUCING ENCASED PRODUCTS AND RELATED DEVICES, METHODS AND COMPUTER PROGRAM PRODUCTS

(75) Inventors: Matthew D. Lowder, Durham, NC (US); Samuel D. Griggs, Raleigh, NC (US); Dennis J. May, Pittsboro, NC (US)

(73) Assignee: Tipper Tie, Inc., Apex, NC (US)

( * ) Notice: Subject to any disclaimer, the term of this patent is extended or adjusted under 35 U.S.C. 154(b) by 777 days.

This patent is subject to a terminal disclaimer.

(21) Appl. No.: 12/050,396

(22) Filed: Mar. 18, 2008

(65) Prior Publication Data

US 2008/0236103 A1      Oct. 2, 2008

Related U.S. Application Data

(60) Provisional application No. 60/896,993, filed on Mar. 26, 2007.

(51) Int. Cl.
    *A22C 11/02*     (2006.01)
(52) U.S. Cl. .......................... 452/34; 452/32
(58) Field of Classification Search .............. 452/30–32, 452/34–35, 37, 48
    See application file for complete search history.

(56) References Cited

U.S. PATENT DOCUMENTS

| | | | |
|---|---|---|---|
| 3,389,533 A | 6/1968 | Tipper et al. | |
| 3,499,259 A | 3/1970 | Tipper et al. | |
| 3,745,610 A * | 7/1973 | Urbutis | 452/28 |
| 3,975,795 A * | 8/1976 | Kupcikevicius et al. | 452/38 |
| 4,516,387 A | 5/1985 | Kupcikevicius | |
| 4,570,301 A * | 2/1986 | Beckman et al. | 452/35 |
| 4,577,370 A * | 3/1986 | Kollross | 452/22 |
| 4,580,316 A * | 4/1986 | Gunter | 452/22 |
| 4,590,749 A * | 5/1986 | Temple et al. | 452/24 |
| 4,599,764 A * | 7/1986 | Knepshield | 452/38 |
| 4,649,601 A * | 3/1987 | Kollross | 452/22 |
| 4,675,945 A | 6/1987 | Evans et al. | |
| 4,683,700 A | 8/1987 | Evans et al. | |
| 4,709,450 A * | 12/1987 | Stanley et al. | 452/31 |
| 4,766,713 A | 8/1988 | Evans | |
| 4,771,510 A * | 9/1988 | Kawai | 452/35 |
| 4,847,953 A | 7/1989 | Evans et al. | |
| 5,074,386 A | 12/1991 | Evans | |
| 5,085,036 A | 2/1992 | Evans et al. | |
| 5,161,347 A | 11/1992 | May et al. | |
| 5,167,567 A | 12/1992 | Evans | |
| 5,203,760 A | 4/1993 | Chen et al. | |
| 5,468,179 A * | 11/1995 | Stanley et al. | 452/37 |
| 5,495,701 A | 3/1996 | Poteat et al. | |
| 5,586,424 A | 12/1996 | Chen et al. | |
| 6,401,885 B1 | 6/2002 | Whittlesey | |
| 6,932,688 B2 | 8/2005 | Stanley et al. | |
| 7,306,511 B2 | 12/2007 | Whittlesey | |
| 7,488,243 B2 * | 2/2009 | Wince et al. | 452/30 |
| 2005/0034426 A1 | 2/2005 | Griggs et al. | |
| 2006/0105690 A1 | 5/2006 | Wince et al. | |
| 2007/0028565 A1 | 2/2007 | Griggs et al. | |
| 2008/0060916 A1 | 3/2008 | Whittlesey | |

* cited by examiner

*Primary Examiner* — David Parsley
(74) *Attorney, Agent, or Firm* — Myers Bigel Sibley & Sajovec, P.A.

(57) ABSTRACT

Reruckers and associated methods and systems configured to automatically reruck netting in an upstream direction on a netting chute or horn proximate in time to a clipping operation to pull a clipped end portion of the netting snugly against a discharge end of the chute or horn.

24 Claims, 13 Drawing Sheets

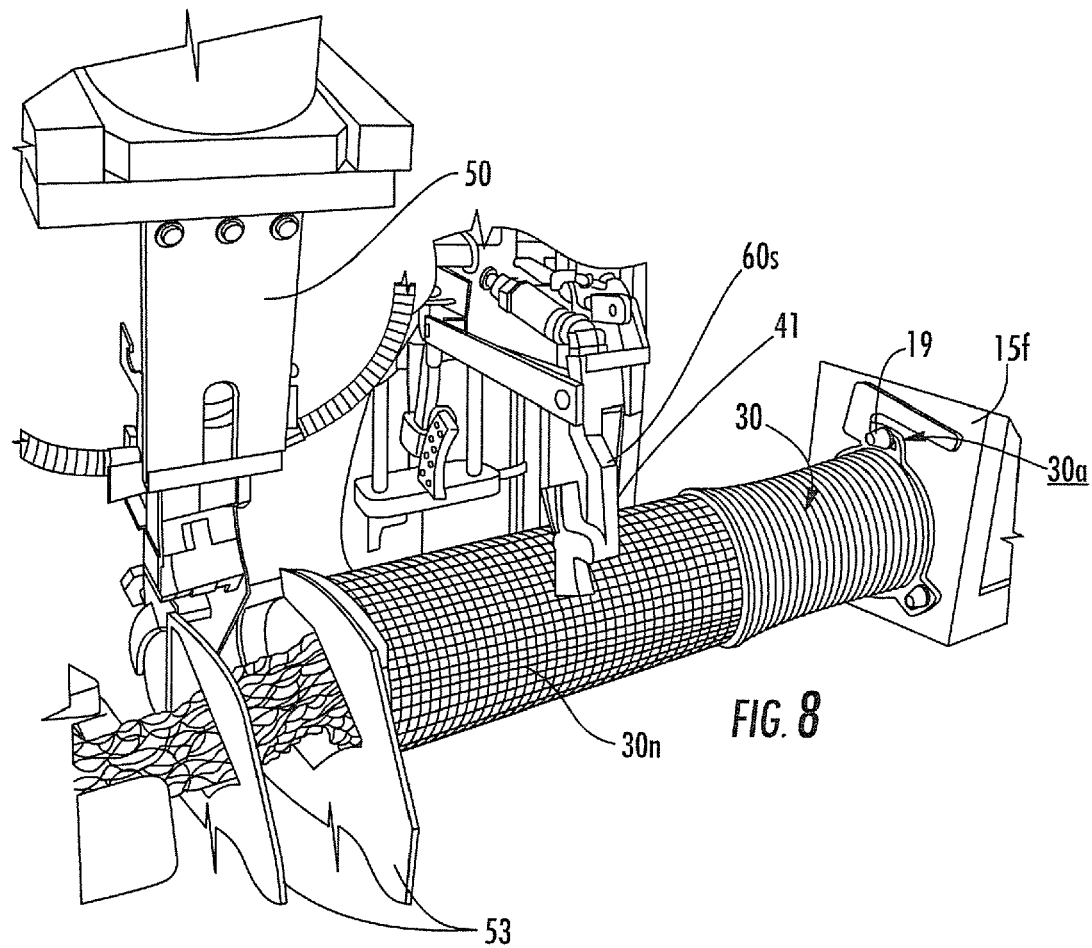

SYSTEMS WITH COOPERATING RERUCKERS FOR PRODUCING ENCASED PRODUCTS AND RELATED DEVICES, METHODS AND COMPUTER PROGRAM PRODUCTS

RELATED APPLICATION

This application claims the benefit of priority of U.S. Provisional Application Ser. No. 60/896,993, filed Mar. 26, 2007, the contents of which are hereby incorporated by reference as if recited in full herein.

FIELD OF THE INVENTION

The present invention relates to apparatus, systems, methods and computer program products that stuff or fill product into elastic casings, typically netting, that enclose products therein.

BACKGROUND OF THE INVENTION

Conventionally, in the production of consumer goods such as, for example, meat or other food products, the food is fed (typically pumped) or stuffed into a casing in a manner that allows the casing to fill with a desired amount of the product. As is well-known, the casings can be a slug-type natural or artificial casing that unwinds, advances, stretches and/or pulls to form the elongate casing over the desired product. Another type of casing is a heat-sealed tubular casing formed by seaming a thin sheet of flexible material, typically elastomeric material, together. U.S. Pat. Nos. 5,085,036 and 5,203,760 describe examples of automated substantially continuous-feed devices suitable for forming sheet material or flat roll stock into tubular film casings. The contents of these patents are hereby incorporated by reference as if recited in full herein.

It is known to use edible collagen film to cover semi-solid sections of meat during processing to form a smoked meat product that gives the appearance of a solid meat muscle, such as a boneless ham. One example of a known prior art apparatus used to form a smoked meat product is the "TCM2250" pumpable model from Tipper Tie, Inc., located in Apex, N.C. Another prior art apparatus is the WM Netter model also available from Tipper Tie, Inc.

Clip attachment apparatus or "clippers" are well known to those of skill in the art and include those available from Tipper Tie, Inc., of Apex, N.C., including product numbers Z3214, Z3202, and Z3200. Examples of clip attachment apparatus and/or packaging apparatus are described in U.S. Pat. Nos. 3,389,533; 3,499,259; 4,683,700; and 5,161,347, the contents of which are hereby incorporated by reference as if recited in full herein.

A double clipper can concurrently apply two clips to the tails and leading portions of casings or "chubs". One clip defines the first end portion of the next package or chub and the other defines the trailing or second end portion of the package or chub then being closed. A cutting mechanism, typically incorporated in the clipper, can sever the two packages before the enclosed package is removed from the clipper apparatus. U.S. Pat. No. 4,766,713 describes a double clipper apparatus used to apply two clips to a casing covering. U.S. Pat. No. 5,495,701 proposes a clipper with a clip attachment mechanism configured to selectively fasten a single clip or two clips simultaneously. U.S. Pat. No. 5,586,424 proposes an apparatus for movement of U-shaped clips along a rail. The apparatus includes a clip feed for advancing clips on a guide rail and the arm is reciprocally driven by a piston and cylinder arrangement. The contents of each of these patents are hereby incorporated by reference as if recited in full herein.

In the past, telescoping (axially extending and retracting) conveyors, such as that proposed by U.S. Pat. No. 6,932,688, have been used to hold (clipped) packages of pumped product discharged from a stuffing horn to support the packages and transfer them downstream of the clipper. The contents of this patent are hereby incorporated by reference as if recited in full herein.

Despite the foregoing, there is a desire for alternative automated production apparatus that can provide one or more of increased production capability, reduced footprint or floor space requirements, improved automation, desired consistent product shape and/or a consistent clip position on trailing and leading edge portions of the products.

SUMMARY OF EMBODIMENTS OF THE INVENTION

Embodiments of the present invention provide apparatus, systems, devices, methods and computer program products configured to reruck packaging material (such as casings, and more typically, netting) in an automated or semi-automated manner.

Typically the rerucking is carried out after a clipping operation and before and/or during a filling operation.

Some embodiments are directed to systems for packaging products in elastic covering material. The systems include: (a) a horn or chute having a length, an outer surface and an internal channel extending therethrough; (b) a clipper aligned with and residing downstream of the horn or chute; and (c) an automated rerucker operatively associated with the horn or chute, whereby the rerucker is configured to automatically pull a clipped end portion of elastic covering material toward an upstream end portion of the horn or chute.

In some embodiments, the systems include a sleeve of elastic netting covering material residing on the horn or chute. The automated rerucker can be configured to automatically reruck netting after but proximate in time to a clipping operation to pull a clipped end portion of the netting to snugly cover a discharge end cavity of the chute and/or horn.

The rerucker can contact netting upstream of a leading tail comprising the clipped end portion to pull the clipped end portion in an upstream direction so that a clip defining the clipped end portion resides substantially axially aligned with a centerline of a discharge cavity associated with the chute or horn. The rerucker may be configured to pull the clipped end portion of the netting rearward within about 5 seconds to about 3 minutes after a clip is applied to a gathered portion of netting located downstream of the chute or horn that defines the clipped end portion of the netting.

Other embodiments are directed to rerucker assemblies for cooperating with a netting chute to automatically pull a tail of netting upstream toward the netting chute. The assemblies include: (a) a first pair of grippers mounted to a horizontal slide assembly, the grippers attached to a bracket slidably mounted to at least one horizontal slide; (b) an axial movement actuation cylinder in communication with the horizontal slide assembly configured to automatically move the first pair of rerucker grippers axially rearward after the grippers are in an extended chute or horn contact configuration; and (c) a lateral actuation cylinder in communication with the first pair of netting grippers for automatically pivoting the rerucker netting grippers between the extended contact configuration and a retracted configuration.

In some embodiments the rerucker can be provided in combination with a derucker assembly. The derucker assembly comprises a second pair of netting grippers mounted to the horizontal slide assembly and in communication with an axial movement actuation cylinder. The first and second set of grippers can be configured to travel axially in concert during both rerucking and derucking operation and actuate independently to close against a chute or horn.

The horizontal slide assembly can include a first laterally extending horizontal support bar that is attached to the bracket and holds the first and second pair of grippers. The gripper actuation cylinders can be configured to controllably pivot the grippers toward and away from opposing sides of the netting chute substantially in concert.

Other embodiments are directed to a system with a rerucker and a derucker that cooperate with a horn or a netting chute to automatically draw netting to a downstream location on the netting chute and pull a clipped end portion of the netting in an upstream direction until stretched tightly across a discharge opening of the horn or chute to receive a quantity of product.

In operation, the system may be configured to apply at least one clip and/or form a loop handle, then pull the netting in an upstream direction until stretched tightly proximate the discharge opening of the horn or chute to receive a quantity of product.

Still other embodiments are directed to computer program products. Some embodiments are directed to computer program products for operating a rerucker and derucker that cooperate with a supply of elastic netting material. The computer program product includes a computer readable storage medium having computer readable program code embodied in the medium. The computer-readable program code includes computer readable program code configured to direct the movement of the derucker through a derucking stroke cycle and the rerucker during a rerucker stroke cycle, the rerucker stroke cycle synchronized to operate proximate in time but after a clipping operation.

In some embodiments, the computer program products include computer readable program code configured with two automated operational modes for two pairs of gripping derucker arms, a rerucking mode and a derucking cycle mode. In particular embodiments, the program code is configured to control the pressure of a rerucker and derucker pressure regulator operatively associated with the gripping rucker and derucker arms, respectively.

The computer program product can also include computer readable program code configured to direct the movement of a rerucker assembly to cause the rerucker to automatically reciprocally move between upstream and downstream locations to carry out a rerucker stroke cycle; and computer readable program code that is configured to synchronize the rerucking stroke cycle with operation of a clipper.

Optionally, the computer program product can include computer readable program code configured to time a pumping of food emulsion through a horn proximate in time but after the rerucker pulls netting tight against a discharge end of the horn.

It is noted that embodiments described with respect to a particular type of implementation can be implemented in other ways, such as for example, where embodiments are described as methods those features can be implemented as computer program products (software) and/or hardware devices. These and other objects and/or aspects of the present invention are explained in detail in the specification set forth below.

BRIEF DESCRIPTION OF THE DRAWINGS

FIG. 8 is a side perspective view of a portion of the apparatus shown in FIG. 1, illustrating a combination rerucker/derucker assembly according to some embodiments of the present invention.

DETAILED DESCRIPTION OF EMBODIMENTS OF THE INVENTION

Figure 1:
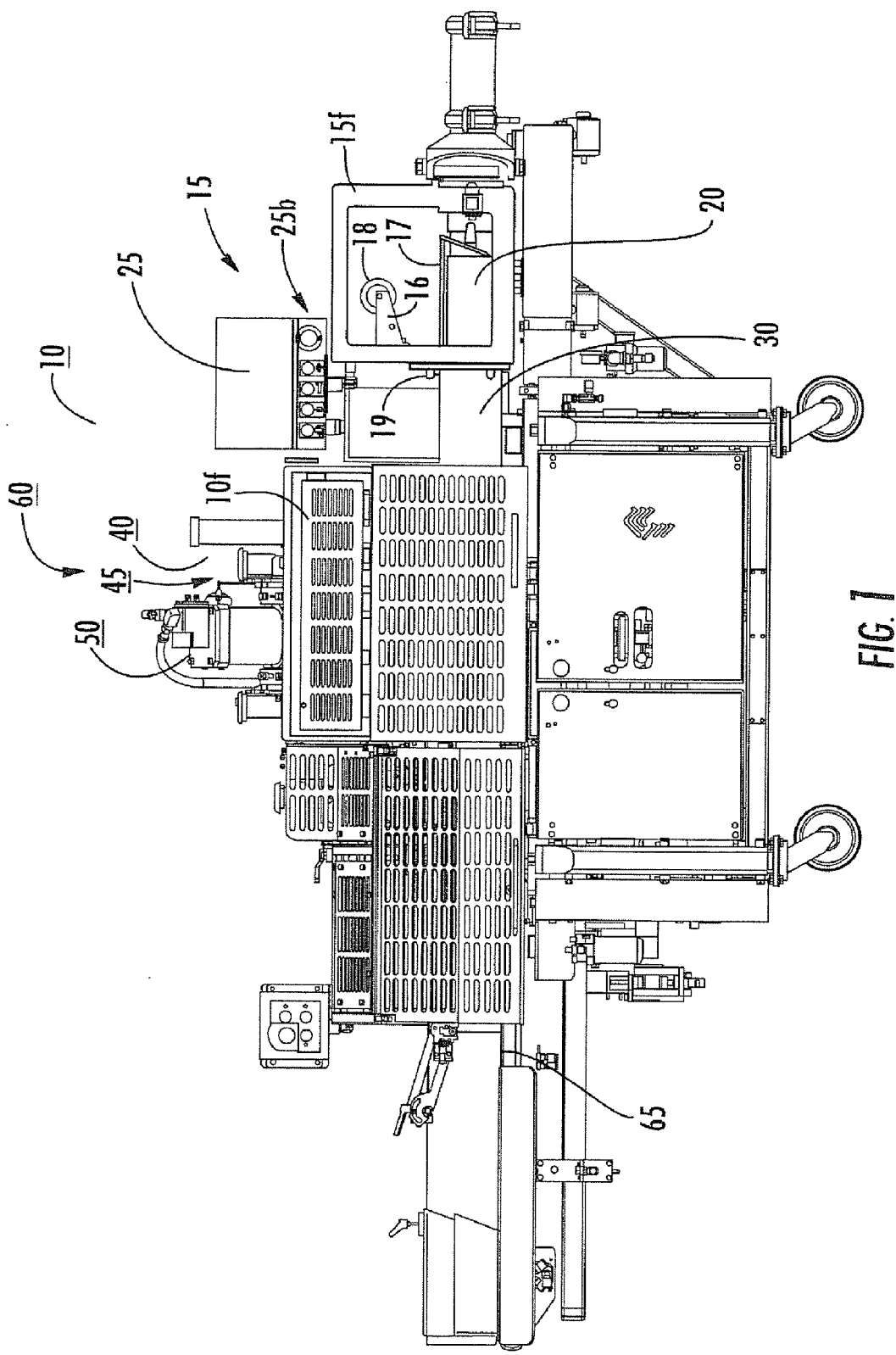
FIG. 1 is a front view of an exemplary packaging apparatus according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the claims or figures unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain terms are employed to refer to the positional relationship of certain structures relative to other structures. As used herein, the terms "front," "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward," "upstream" and derivatives thereof refer to the directions opposite, respectively, the forward and downstream directions.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The term "frame" means a generally skeletal structure used to support one or more assemblies, modules and/or components. The term "modular" means that a subassembly is designed with standardized dimensions, mounting features and/or configurations for interchangeable use with other equipment. In certain embodiments, the apparatus can employ a releasably attachable casing module that is configured to have the same centerline as a horn and may be selectively mounted on a "heat-seal" or other type of pumpable product/casing supply apparatus. The term "automated" means that the apparatus is configured to carry out most actions via automated control (i.e., pumping, encasing, voiding, clipping) without requiring ongoing manual assistance. Embodiments of the invention may be particularly suitable as high-capacity, heavy-duty industrial packaging equipment for packaging consumable goods, such as, meat products.

The casing can be any suitable casing (edible or inedible, natural or synthetic) such as, but not limited to, collagen, cellulose, plastic, elastomeric and/or polymeric casing. However, embodiments of the present invention may be particularly suited for use with edible and/or process-dissolvable, -resorbable and/or -absorbable casing materials. In some embodiments, the apparatus or methods can employ edible roll stock comprising a collagen film or a dissolvable protein sheet (which is typically less flexible and more paper-like than the collagen film). The process-dissolvable protein may be configured to be absorbed and/or dissolved during cooking.

When using rolls of protein sheet, it may be desirable to apply moisture during the forming of the flat roll of casing material into a generally tubular casing material. However, when forming using collagen film, moisture during the forming process is typically undesirable, albeit it is used after the casing is shaped to help moisture-seal the casing together about the product. In some embodiments, the film and protein sheet can be about 0.002 inches thick. The protein sheet and/or film may be configured to dissolve during processing.

The netting and casing enclosed product can be generally bulbous food product, typically a meat product. The present invention is particularly suitable for producing products that may also employ closure clips to seal products held in the netting and casing. However, other closure configurations may be used, such as, knots or ties.

The product may be a linked chain of elongated extruded product held in a casing or a plurality of discrete products that can be formed into generally bulbous elongate shapes. Exemplary products include, but are not limited to, netted smoked and/or cooked ham, netted poultry, netted roasts, netted salami, netted sausages, netted cheese and the like.

Other embodiments of the present invention may be directed to seal other types of food (such as cheese) or other product in casing materials (which are also typically held in netting). Examples of other products include powders such as granular materials including grain, sugar, sand and the like, or other flowable materials including wet pet food (similar to that held conventionally in cans) or other granular, semi-solid and/or gelatinous materials. The product may be a packaged for any suitable industry including food, aquaculture, agriculture, environment, chemical, explosives, or other applications.

In the past, deruckers have been used to pull segments of a sleeve of netting off a netting chute or horn. The deruckers have also been configured to apply a braking force against the chute to pinch the netting during packaging. Unfortunately, the braking mode does not always provide sufficient product control in some systems.

Figure 6:
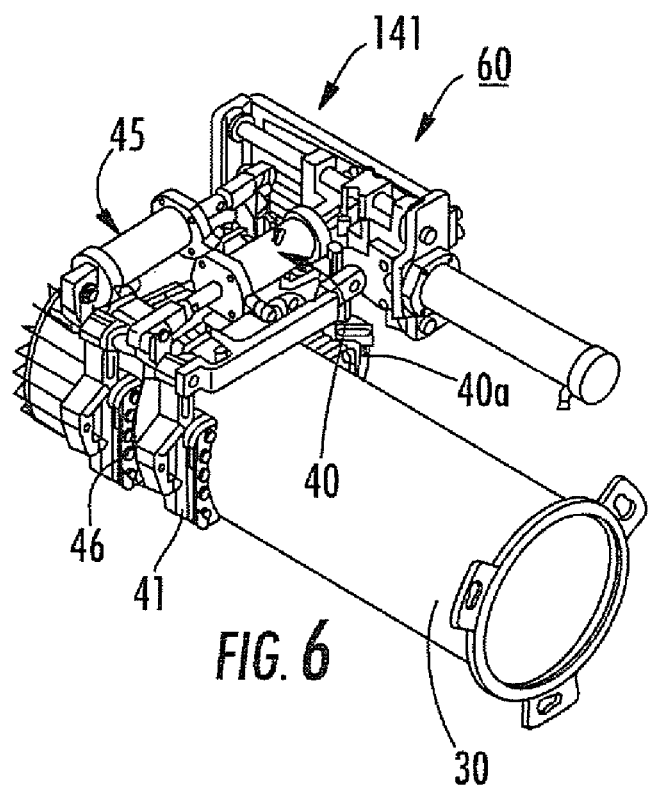
FIG. 6 is a side perspective view of the horn with the rerucker and derucker assembly shown in FIG. 3, with the rerucker and derucker members positioned upstream relative to the position shown in FIG. 3, during a rerucking operation according to embodiments of the present invention.

Turning now to FIG. 1, an exemplary packaging apparatus or system 10 is shown. As shown, the apparatus 10 may optionally include a casing forming assembly 15, a product horn 20, a controller 25 with a user input (which can be configured as a Human Machine Interface ("HMI")), a netting chute 30 (see also FIG. 8 illustrating a sleeve of netting 30s thereon), a derucker 40, a rerucker 45 and a clipper assembly 50 that can include a voider 53 (FIG. 6). The apparatus 10 may also include a conveyor 65 disposed downstream of the netting chute 30.

The apparatus 10 is configured to engage a pump and filling source (not shown) disposed upstream of the horn 20. The pump can be in communication with a portioner as is known to those of skill in the art. In other embodiments, an operator or automated loader can load whole muscle or other product into a (compression) chamber or onto a conveyor and the product can be pushed out of the chute/horn into the netting. See, e.g., co-pending, co-assigned U.S. Provisional Application Ser. No. 60/806,112, and U.S. Application Publication No. US-2005-0034426-A1, the contents of which are hereby incorporated by reference as if recited in full herein. See also, U.S. Pat. No. 4,516,387.

It is noted that, in the embodiment shown in FIG. 1, the apparatus includes both a horn (also known as a stuffing horn) and a netting chute, but the instant invention is not limited thereto and can be used with other apparatus including systems where the netting or other (sleeve of) covering material is held by the horn or systems configured to operate with a netting chute in isolation of a horn. Similarly, the system can be configured to package the product in a casing (typically netting) that is held only in netting that is held on a chute or on a horn.

Figure 2:
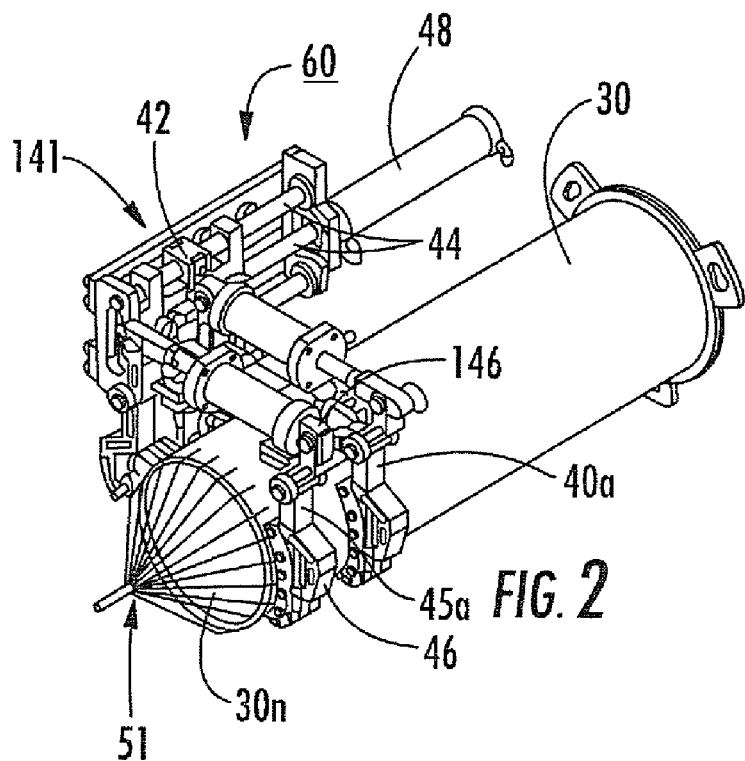
FIG. 2 is a side perspective view of a horn with a rerucker and derucker assembly taken from the discharge end according to embodiments of the present invention.
Figure 3:
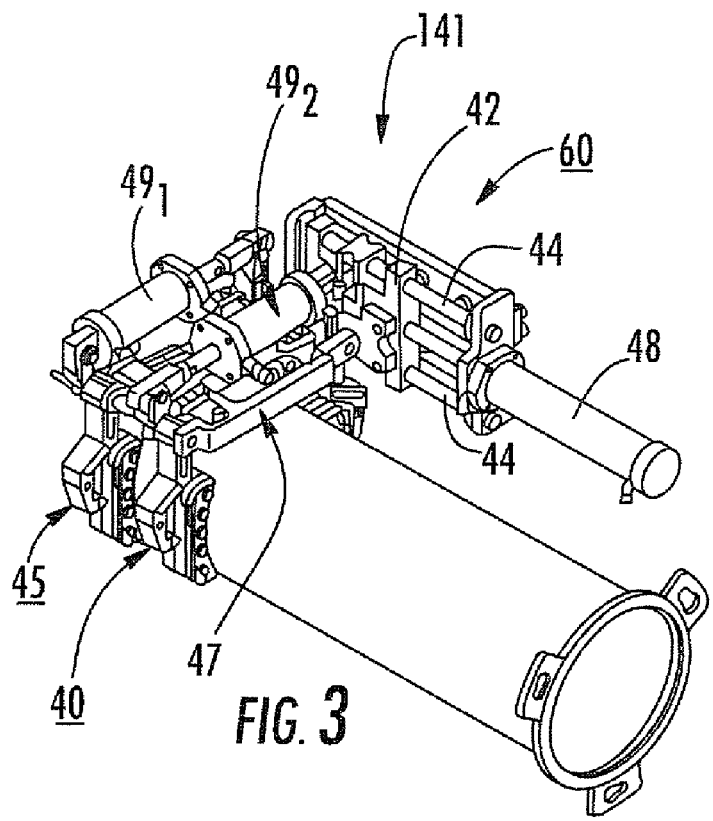
FIG. 3 is a side perspective view of the horn with the rerucker and derucker assembly taken from the intake end according to embodiments of the present invention.
Figure 4:
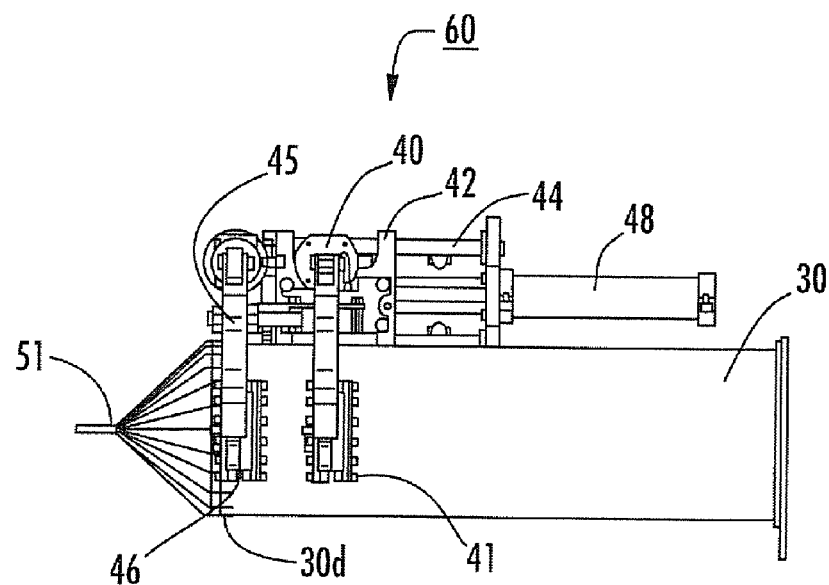
FIG. 4 is a side view of the devices shown in FIGS. 2 and 3.
Figure 7:
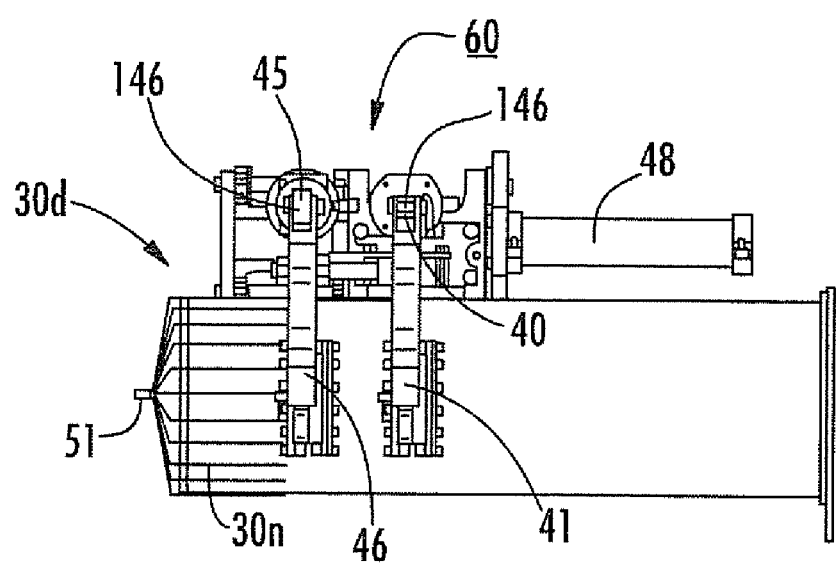
FIG. 7 is a side view of the devices shown in FIGS. 4 and 5 with the rerucker and derucker members positioned upstream relative to the position shown in FIG. 6, during a rerucking operation according to embodiments of the present invention.

As shown in FIGS. 2-7, the derucker 40 and rerucker 45 may be formed as an assembly 60 with separate pairs of rucking and derucking grippers 46, 41, respectively. As shown, the rerucker 45 is closest to the discharge end of the chute 30 with the derucker 40 residing axially spaced apart from but adjacent to the rerucker 45. A single axial drive cylinder 48 can be used to operate both the derucker and rerucker 40, 45. As shown, the rerucker 45 can include a lateral drive cylinder $49_1$ that communicates with the primary drive cylinder 48 and directs the respective grippers 46 to close against the chute 30. Similarly, the derucker 45 can include a lateral drive cylinder $49_2$ that communicates with the primary drive cylinder 48 and directs the respective grippers 41 to close against the chute 30. In operation, as shown in FIG. 4, the rerucker grippers 46 close against opposing sides of the chute 30 at a position proximate the discharge end portion of the chute 30*d*. Then, as shown in FIG. 7, the rerucker 45 (and derucker 40) move axially rearward during a rerucking stroke cycle, with the grippers 46 pulling the netting 30*n* sufficiently tight to have the netting taut across the cavity of the discharge end of the chute 30.

The rerucker 45 can be configured to make sure that the leading-tail of the netting is substantially completely filled to produce a consistent desired shape. The rerucker 45 may be particularly useful for systems that position the clipper 50 away from the end of the chute between about 0.75 inches to about 10 inches, typically between about 1-3 inches, which can leave a short loose tail. The rerucking operation can be carried out after each successive product is packaged before discharging the next product from the chute 30. The rerucking can be automatically initiated after a clip is applied to netting to define a leading edge portion of netting, typically within about 1 second to about 10 minutes, more typically between about 1 second to about 5 minutes, such as between about 5 seconds to about 3 minutes, after a clipping operation where at least one clip is applied to gathered netting. The system 10 may cut the netting intermediate two adjacent clips, thereby releasing an encased product and defining a leading edge portion of netting that captures the next product.

The cylinder 48 that moves the assembly can produce between about 100-200 lbs of force, typically about 140 lbs of force. Once the netting is stretched tight across the opening, the grippers 46 can stop rearward movement and can be configured to apply less contact force so as to slip to allow netting to pull forward during the remainder of the rerucker stroke cycle. This slipping action can apply a braking force to limit the axial rate of pull from the chute from the stop location. The rerucker 45 can be configured to have a typical rearward travel length for the rerucker stroke cycle of between about 1-24 inches, typically between about 2-8 inches. The rerucker 45 can communicate with a force or pressure sensor that provides data to a controller that can be used to automatically (electronically) stop the rearward movement at the proper time. In other embodiments, the rerucker 45 can be used to move axially rearward a fixed distance each time for a respective desired product shape/size. Other electrical, mechanical and/or electromechanical devices such as trips, levers, linkages or switches that can be used to transition the rerucker from an active pulling to a slip/brake and/or disengaged operational mode.

The derucker 40 and rerucker 45 can be configured to move axially in concert and in a constant axially spaced relationship, mounted to a common support frame, but during a typical rerucking stroke cycle, the derucker 40 can remain disengaged, with the derucker grippers 41 not contacting (laterally spaced from) the chute 30 and netting thereon. As noted above, the grippers 46 can stop at the axial stop location, and loosen their grip to slip during the latter portion of the rerucking cycle. The "slip" action can apply a lesser braking force to the netting. Alternatively, the grippers 41 can apply a braking force to the netting as desired, alone or with the rerucker grippers 46.

In other embodiments, the rerucker 45 and derucker 40 can both operate during the rerucking cycle with both grippers 46, 41, respectively, contacting the chute 30 and pulling the netting rearward in concert.

In some alternative embodiments, as shown for example in FIG. 8, the rerucker/derucker can be a combination device 60*s* that employs a single pair of grippers 41 that can be used to both reruck and deruck the netting and may also be configured to apply a braking force to the netting. The derucking can be carried out by having the derucker 40 successively contact the chute 30 and move forward, disengage the chute, then move axially rearward and repeat the operation, to pull lengths of the sleeve of material toward the clipper 50. The rerucker 45 can move with the derucker 40 but the rerucker grippers 46 can remain laterally extended and disengaged from the chute 30 during the derucking operation.

Figure 14:
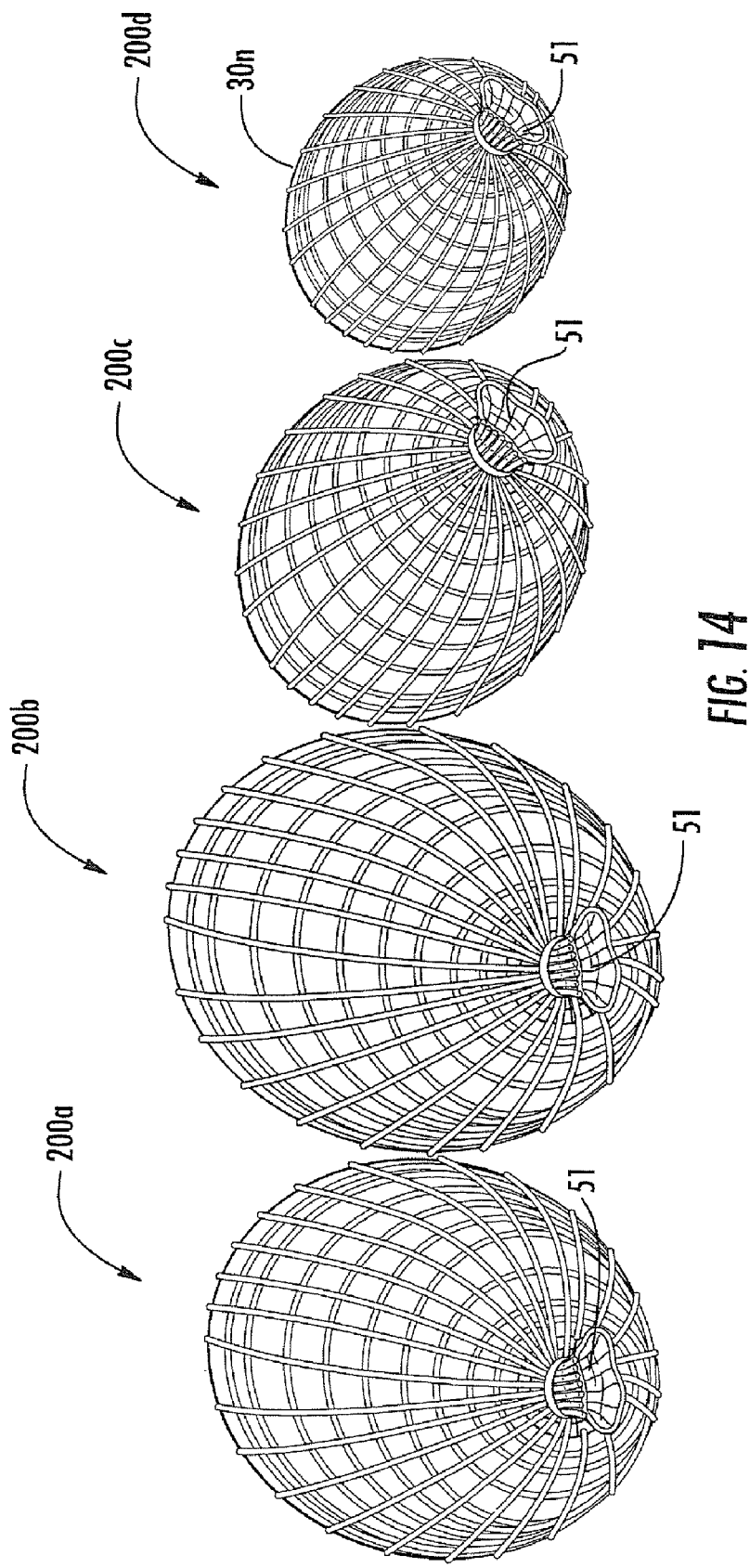
FIG. 14 is a front perspective view of alternate shapes that can be generated using a rerucker assembly according to embodiments of the present invention.

As shown in FIG. 14, the netting 30*n* can be elastic and configured to stretch more in the radial direction than in the axial direction to produce products 200 of various bulbous configurations and sizes, shown with alphabetic suffixes 200*a*-200*e* for ease of reference.

As shown in FIG. 8, the netting 30*n* can be tightly held on the netting chute with the sleeve 30*s* configured to hold bunched, compressed or more gathered portions of the netting upstream of the egress portion of the chute 30.

Referring again to FIGS. 2-7, the rerucker 45 and derucker 40 may be configured to mount to the apparatus 10 (FIG. 1) and cooperate with the netting chute 30 and casing module 15 so that, during pumping, the derucker assembly 40 can automatically retract and extend to pull lengths of the sleeve material 30*s* in a downstream direction proximate the egress portion of the netting chute 30. The rerucker and derucker 40, 45 can be in communication with a controller such as an HMI (Human Machine Interface) as will be discussed below. The rerucker 45 and/or derucker 40 can also be configured to act as a braking assembly that pinches the netting against the chute 30 at desired intervals, such as during a voiding/clipping operation. The rerucker 45 and/or derucker 40 can be configured to automatically engage in their primary operative mode synchronized with the clipper 50 and automatically switch to a braking operation mode as appropriate for the system and product.

As shown, the rerucker 45 and derucker 40 includes a pair of arms 45*a*, 40*a* that are sized and configured to span the chute 30 and are configured to travel repeatedly and automatically through a respective rerucker and derucker stroke cycle. The stroke cycle is configured so that the arms 40*a*, 45*a* travel laterally toward each other to a contact configuration at a first location (that may be called a start position) whereby the arms 40*a*, 45*a* cause the grippers 41, 46 to engage, grip, pinch and/or grasp the netting with sufficient force on generally opposing side portions of the chute 30 so as to be able to pull or draw a segment of sleeve material downstream (or the derucking operation) and upstream (for the rerucking operation) as either arms 40*a* or arms 45*a* travel substantially in concert in the contact configuration to a second location (that can be called an end position) that is axially spaced apart from the first location. In the derucking mode, at the second location, which for the derucking cycle is typically proximate the egress or discharge end portion of the chute 30, the arms 40*a* travel laterally away from each other (and the chute 30) to release the netting, then travel in a non-contact configuration as they return to the first starting location whereby they can engage a second segment of netting. In the rerucking mode, the arms 45*a* can "slip" in position at the second location as described above. In some embodiments, the arms 45*a* can laterally translate to disengage the grippers 46 at the second location. The grippers 41, 46 can comprise an elastomeric and/or increased friction material. The derucking stroke cycle can provide a more uniform distribution of netting or tension in the netting proximate the discharge end of the chute 30.

Figure 5:
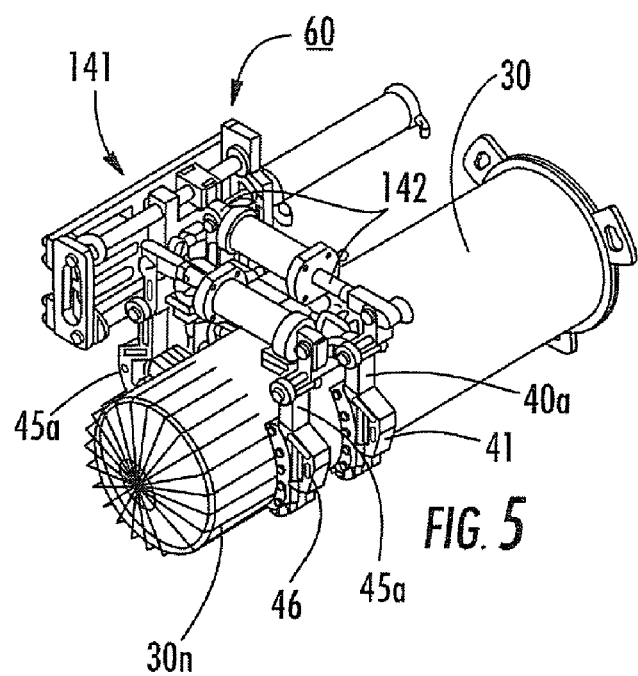
FIG. 5 is a side perspective view of the horn with a rerucker and derucker assembly shown in FIG. 2 with the rerucker and derucker members positioned upstream relative to the position shown in FIG. 2, during a rerucking operation according to embodiments of the present invention.

FIGS. 2 and 5 show that the rerucker 45 and derucker 40 slidably mount to a horizontal slide assembly 141 with a support bar 44 via a bracket 42 that slides axially under direction of actuation cylinder 48. One bracket 42 can engage two vertically spaced horizontal bars 44 to slidably axially move between the forward and rearward positions. One of the assemblies 40, 45 can be attached to the other or both can be attached to via the same or different brackets to the bars 44. As shown, the rerucker 45 is attached to the derucker 40 via a support frame 47, with the derucker 45 attached to the bracket 42. The arms 40a, 45a are pivotably mounted to a sliding frame member 146 (FIGS. 2, 7) to controllably pivot the arms 40a, 45a and grippers 41, 46 between closed and open configurations during the respective stroke cycle. The horizontal bars 44 can be configured to define the generally horizontal travel path and axial stroke limits of the rerucker 45 and/or derucker 40. The horizontal slide assembly can include a first laterally extending horizontal support bar 142 that is attached to the bracket 42 and holds the first and second pair of grippers 41, 46. The gripper actuation cylinders $49_1$, $49_2$ can be configured to controllably pivot the grippers toward and away from opposing sides of the netting chute substantially in concert.

The first and second locations of the rerucker and derucker stroke cycles can be adjustable, as can the pressure, and frequency or speed of the stroke. At least one proximity sensor can be used to relay data regarding the position of the bracket on the slide bar(s) 44 to automatically direct the respective grippers 46, 41 to close against (or open away from) the chute 30. The force of the grip can be adjusted via a pressure regulator that is configured to supply pressure to the gripper cylinders $49_1$, $49_2$ (FIG. 3).

In some embodiments, one or both of the rerucker 45 or the derucker 40 can also operate in a braking mode to apply a braking force to compress or pinch the netting proximate the discharge portion of the chute 30 during the clipping/voiding operation. The braking pressure may be greater than the derucking pressure applied by the grippers 41 and/or the rerucking grippers 46. The arms 40a, 45a can remain in a target static location for a desired braking interval. In some embodiments, the arms 40a, 45a are directed to travel forward while open from the first location to a braking region, then close against the sides of the chute 30 for the desired braking interval. The braking mode may be automatically initiated in response to ceasing pumping and/or initiating a voiding operation.

The rerucker 45 and derucker 40 can include a pressure regulator or separate pressure regulators (and the system 10 may include a separate braking pressure regulator) that are in communication with the gripper arm cylinders $49_1$, $49_2$ to control the pressure of a braking and derucker pressures applied by the grippers 41, 46. The pressures in the different braking and derucking modes can be automatically controlled with the gripper arms deployed to carry out the appropriate braking, rerucker, or derucker cycle operational mode. In other embodiments, a common pressure regulator can be used and different pressure regulation control means may be configured to apply the desired pressure to the grippers 41, 46.

Figure 9A:
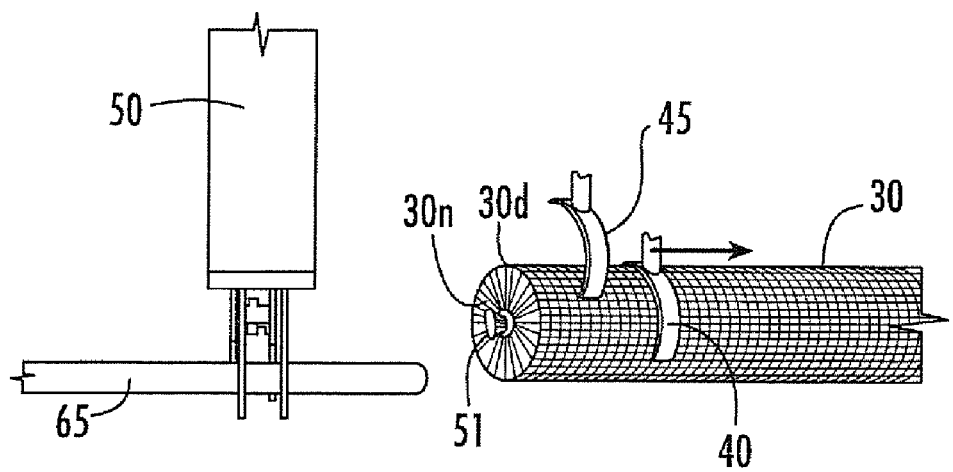
FIGS. 9A-9C are schematic side views of serial configurations of a telescoping conveyor in cooperating alignment with the clipper and discharge chute and/or horn according to embodiments of the present invention.
Figure 9B:
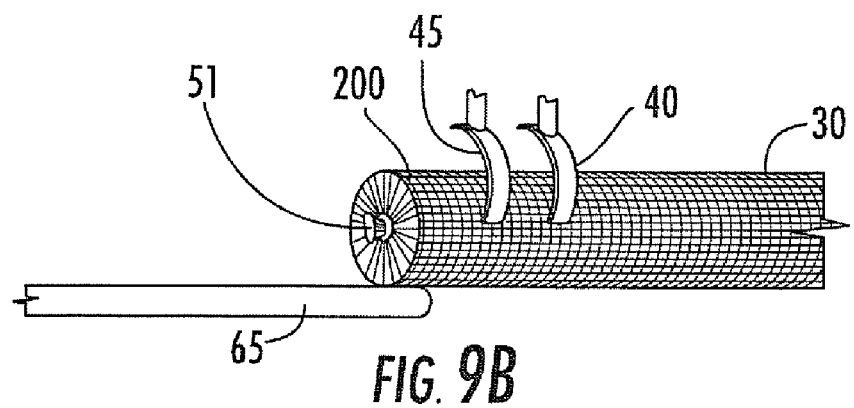
Figure 9C:
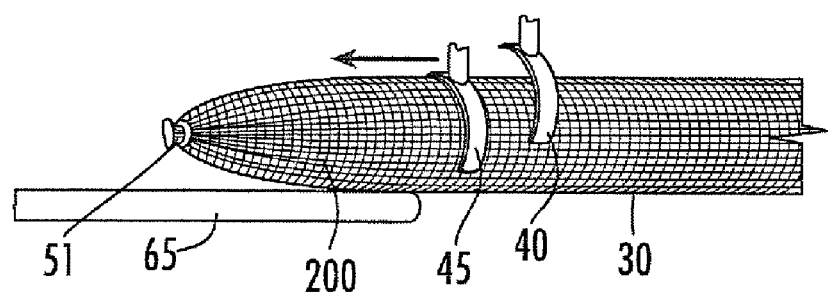

In some embodiments, as shown in FIGS. 9A-9C, the rerucker 45 is synchronized with both the clipper 50 and a cooperating telescoping conveyor 65. Examples of telescoping conveyors are describe in U.S. Pat. No. 6,932,688 and co-pending, co-assigned U.S. Provisional Application Ser. No. 60/824,959, the contents of which are hereby incorporated by reference as if recited in full herein. As shown in FIG. 9A, after a leading tail 51 is clipped and prior to receiving a product (typically the output of which is timed or synchronized with a pushing or pumping operation), the netting is pulled back so that it is tight across the discharge end chute 30. As shown in FIG. 9B, the conveyor 65 holds a discharged stuffed portion of the netting and moves it away from the chute as shown in FIG. 9C. Although shown as suitable for use with a telescoping floor 65, other receiving floor configurations may also be used, such as rollers and static conveyors and the like. The speed of the conveyor 65, size of the horn 20, pump speed, netting size and elasticity, rerucking and the like can be adjusted to consistently provide the desired product shape. A string looper can be formed on one end of the netting using conventional looper apparatus known to those of skill in the art.

Figure 10A:
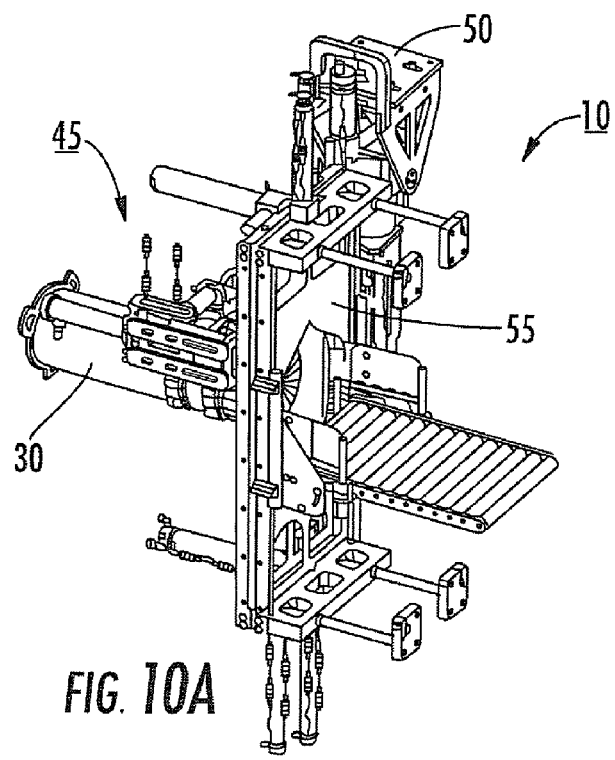
FIGS. 10A-10D are side perspective views of serial configurations of a rerucker and clipper according to embodiments of the invention.
Figure 10B:
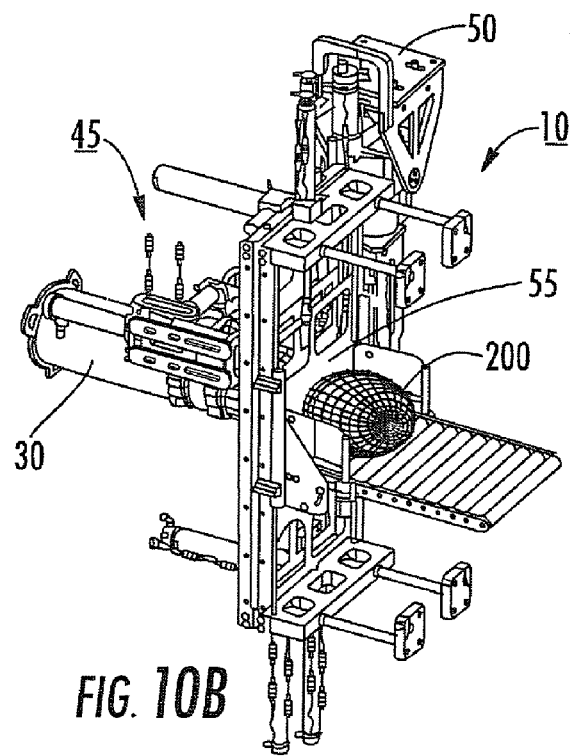
Figure 10C:
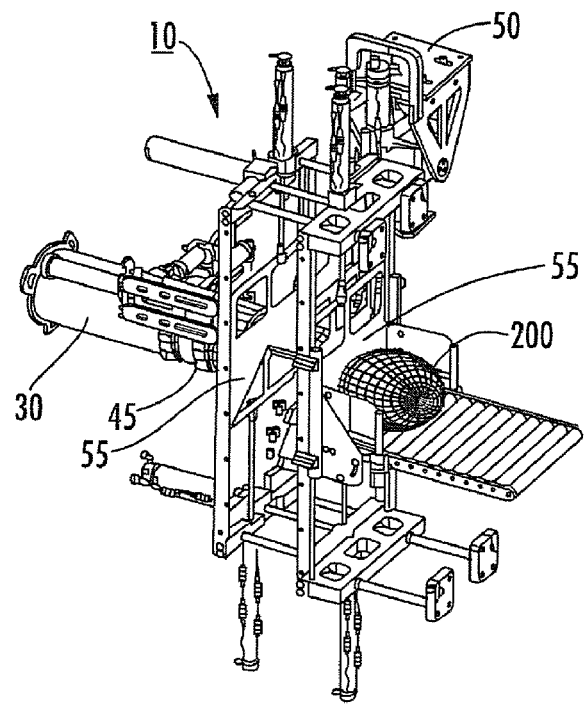
Figure 10D:
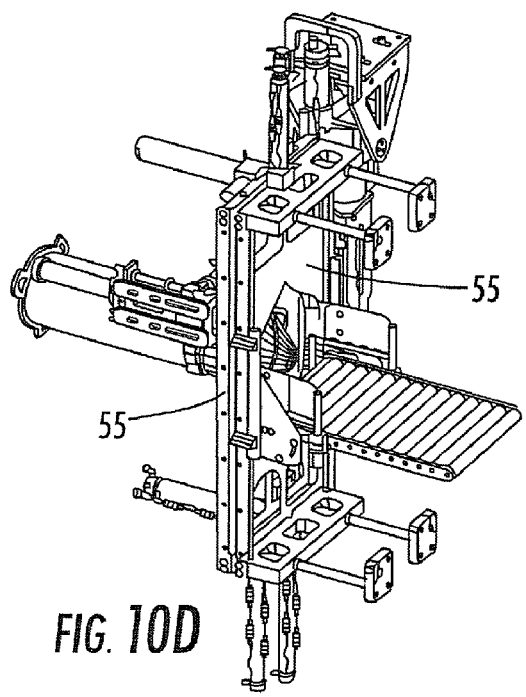
Figure 11A:
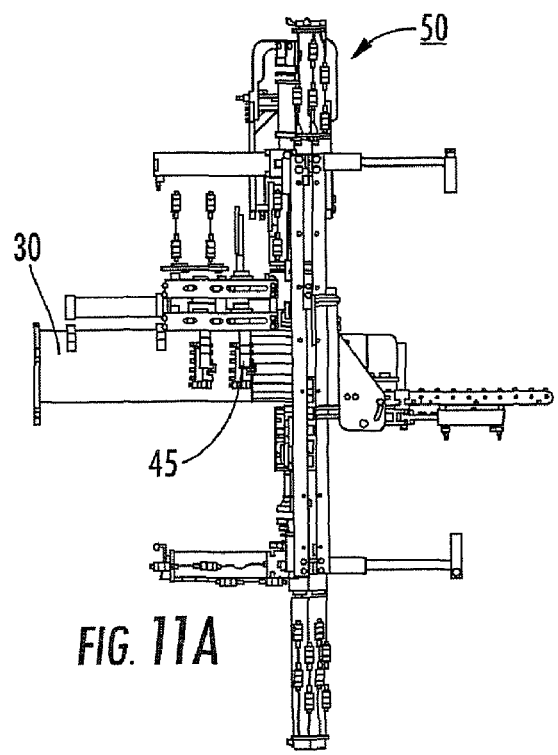
FIGS. 11A-11D are side views corresponding to the side perspective views shown in FIGS. 10A-10D.
Figure 11B:
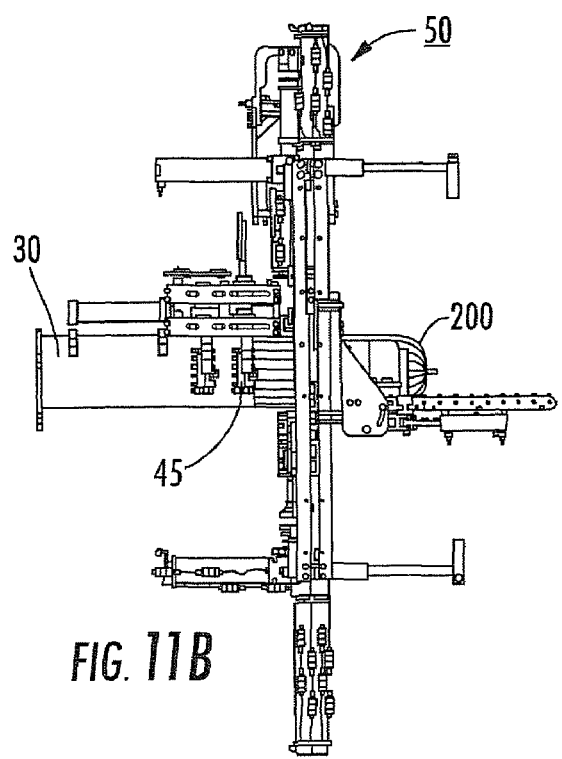
Figure 11C:
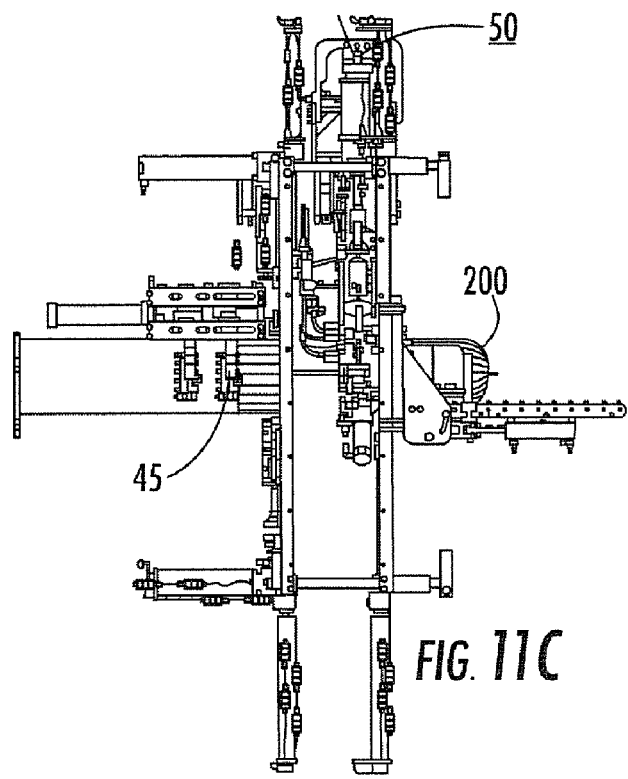
Figure 11D:
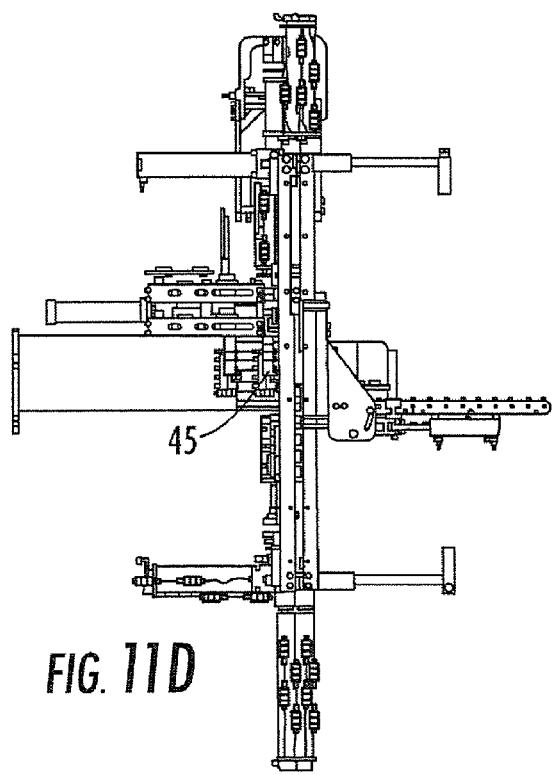

FIGS. 10A-10D and corresponding side views in FIGS. 11A-11D illustrate exemplary serial operations of the rerucker 45. FIGS. 10A, 11A illustrate a home of initial position where voiders 55 are open so that product can pass through while netting is held tight in a "back" or upstream position. FIGS. 10B, 11B illustrate the product 200 is pushed and/or advanced through the voiders 55, at which point, the voiders 55 close. FIGS. 10C, 11C illustrate that the voiders 55 spread axially apart to make room for the clipper 50 to swing in between during a clipping operation. Two spaced apart clips can be applied, typically at about two inches apart (more or less spacing may be used), and the netting between the clipped portions of the netting can be cut or otherwise severed. FIGS. 10D, 11D illustrate that the clipper 50 then swings back to a home position and the voiders 55 open and return back together, axially closely spaced. The rerucker grippers 45 move to the end of the horn or chute 30 and grip the netting. The rerucker 45 pulls the netting rearward (in an axially upstream direction) and held against the horn/chute 30 to prepare for the next product.

Figure 12:
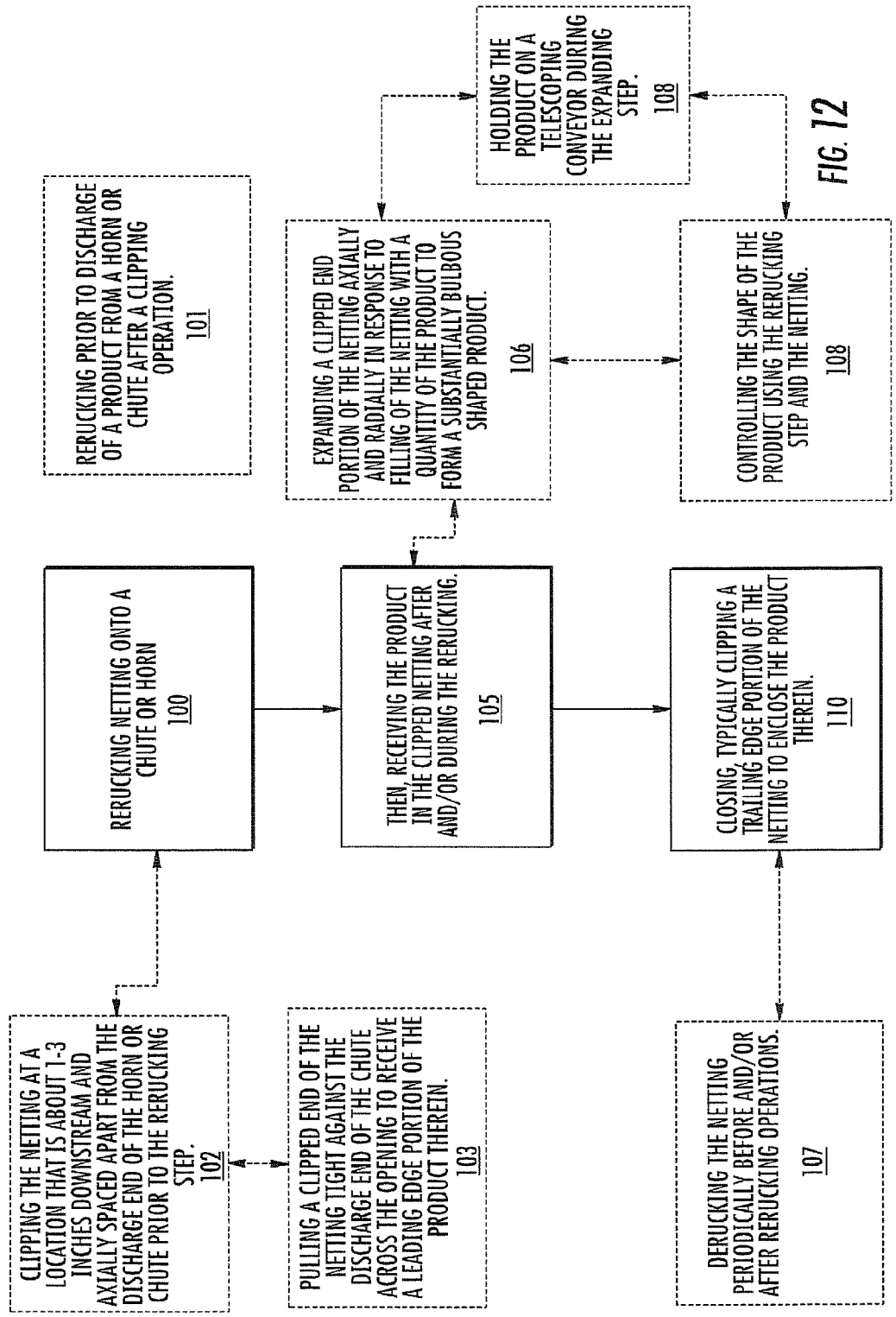
FIG. 12 is a flow chart of operations that can be used to carry out embodiments of the invention.

FIG. 12 illustrates some exemplary operations that may be used to carry out embodiments of the invention. As shown, netting or other covering can be automatically rerucked onto a chute or horn temporally to pull a closed leading edge portion thereof axially reward toward the discharge end of the chute or horn (block 100). Then, a product is received into the rerucked netting or other covering (block 105). Closing, typically clipping, a trailing edge portion of the netting to enclose the product therein (block 110) is then performed.

The rerucking can be carried out to pull the clipped netting back against the chute after and proximate in time to a clipping operation on a serially encased and packaged prior product (block 101), typically between about 10 seconds to about 5 minutes after the clip is applied, to define a leading edge portion of the next product package. The clipped end portion of the netting can expand radially and axially, typically mostly radially, in response to filling of the netting with a quantity of product to form a substantially bulbous product shape (block 106). The product can be held on a telescoping conveyor during the expanding (block 108). The rerucking (and conveyor speed) can help fill the netting and define a desired product shape (block 109).

The netting or other covering can be clipped at a location that is between about 1-3 inches downstream and axially aligned with the discharge end of the chute or horn (block 102). The clipped end portion of the netting or other covering can be pulled tight against the discharge end of the chute so that it resides snugly across the cavity thereat to receive a leading edge portion of the product therein (block 103). The netting or other covering can be derucked intermittently or at desired intervals intermediate the successive rerucking operations (block 107).

In some embodiments, in operation, a clipped end of netting is pulled tight against the discharge end of the chute, then, during the pumping process, the casing (where used) is drawn off the product horn, stuffed with product, and concurrently encased in (elastic) netting. The moisture and/or exudates(s)

in the product can cause the casing to cling to the product and seal the overlapping layers of the casing together along a lower lap seal. Typically the downstream end portion of the netting and casing is clipped or closed to capture the discharged product therein. As the product is discharged from the horn 20 held inside the chute 30, it expands the casing and netting to create a package shape. The netting is stretched tightly over the product with the casing therebetween. The netting can hold the package together during the cooking or other subsequent process and can provide a uniform, aesthetically appealing crosshatch pattern on the finished product. The size of the package formed can vary depending on the casing size, the length of time the filler is activated to discharge product, the tension of the netting, and/or the conveyor speed of the conveyor receiving and holding the encased product. Once the package is filled, the apparatus 10 can void a target portion of the package and apply one or more clips to the voided region of the package. The clipped loose end of the netting can then be pulled rearward during a rerucking cycle to prepare to receive the next product from the chute 30. Typically two clips are applied and the package is severed between the clips using an automated knife, as is well known to those of skill in the art. However, a series of linked products can be formed (such as a product known as "beer balls") where a single clip is placed between the linked products and two clips can be applied to stop the linked package and start another series.

Where used, the horn 20 can include at least a forward or downstream portion that is configured as a double-walled horn (or even greater number of walls) with a sealed air and/or insulated gap space between the inner wall and the outer wall thereof to inhibit moisture forming on the outer wall (from the product in the horn). The double-walled horn 20 may be particularly useful where collagen film casing is employed. In some embodiments, the insulated gap can comprise other insulating materials such as foam, plastic beads, elastomeric materials or other suitable insulating materials including fluids and/or gases. The insulating material can be formed on the inner primary surface of the outer wall or the outer primary surface of the inner wall before the walls are joined. In other embodiments, the insulating material can be flowed into the chamber after the tubes are joined.

As shown in FIG. 8, in some embodiments, the frame 15*f* can also be configured to releasably mount the netting chute 30 thereto. For example, the frame 15*f* can employ bayonet-style mounting configurations, which allow positive positioning and provide for a relatively quick mount and release system. The netting chute 30 can include mounting apertures 30*a* that engage the frame 15*f* for mounting thereto. The frame 15*f* can include forwardly oriented projections 19 which are configured to enter the apertures 30*a* and provide a quick mount (and quick release) configuration.

In particular embodiments, in position, the netting chute 30 is configured to receive at least a portion of the horn 20 therein; typically the netting chute 30 is configured to receive at least a major portion of the horn 20 therein. The horn 20 and netting chute 30 typically terminate at the same axial downstream location. In some embodiments, the downstream portion of the horn 20 may extend out of the netting chute 30 or the netting chute 30 may extend a further downstream axial distance than the horn 20.

The horn 20 and/or chute 30 can be configured to laterally pivot via a rotor assembly or pivot assembly that allows the horn 20 and/or chute 30 to pivot to a load position that is about 20-30 degrees from the operative in-line position. An example of a pivot/rotor assembly is described in U.S. patent application Ser. No. 10/729,282, the contents of which are hereby incorporated by reference as if recited in full herein.

The clipper 50 can include a clipper gate 56 with gathering plates 57 thereon configured to help gather the netting and casing material into a suitably tight gathered rope form for clipping. Examples of suitable clips include metallic generally "U"-shaped clips available from Tipper Tie, Inc., in Apex, N.C. Other clips, clip materials and clip configurations may also be used. Examples of exemplary devices and apparatus used to void, clip or tension casing material are described in U.S. Pat. Nos. 4,847,953; 4,675,945; 5,074,386; 5,167,567; and 6,401,885, the contents of each of which are hereby incorporated by reference as if recited in full herein.

The apparatus 10 can be configured to run generally automatically and continuously over a desired interval (typically between at least about 45-60 minutes, depending on the length of the roll stock and/or netting sleeve). In some embodiments, the apparatus can produce about 10-20, typically about 16, pieces of packaged product per minute (the packaged product typically averaging 3-6 lbs, but can vary).

Figure 13:
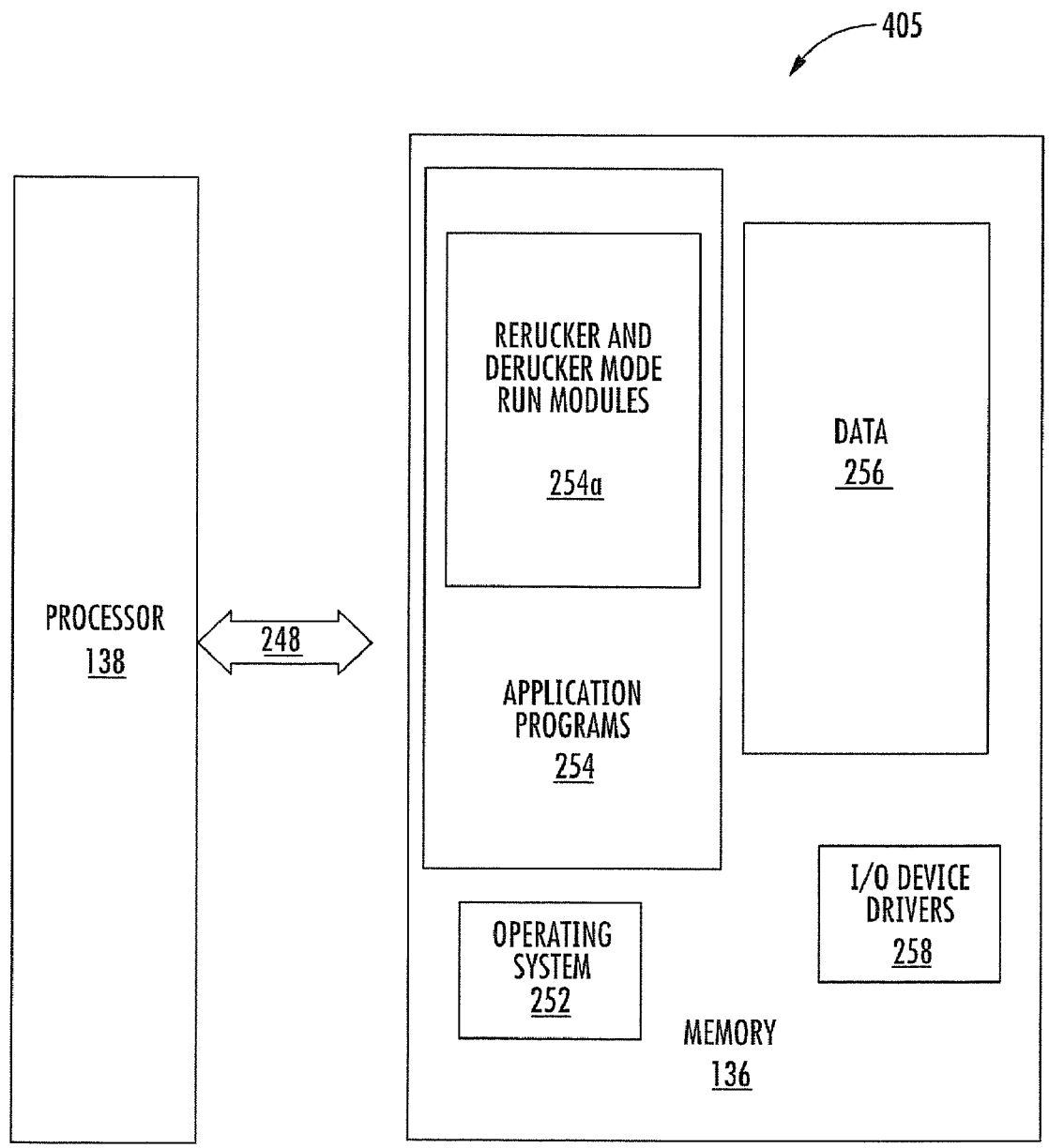
FIG. 13 is a block diagram of a data processing system according to embodiments of the present invention.

FIG. 13 is a block diagram of exemplary embodiments of a data processing system that illustrates computer program products in accordance with embodiments of the present invention. The operation and sequence of events can be controlled by a programmable logic controller. The operational mode or certain input features can be selected by an operator input using a Human Machine Interface (HMI) to communicate with the controller as is well known to those of skill in the art.

The processor 138 communicates with the memory 136 via an address/data bus 248. The processor 138 can be any commercially available or custom microprocessor. The memory 136 is representative of the overall hierarchy of memory devices containing the software and data used to implement the functionality of the data processing system 405. The memory 136 can include, but is not limited to, the following types of devices: cache, ROM, PROM, EPROM, EEPROM, flash memory, SRAM, and DRAM.

As shown in FIG. 13, the memory 136 may include several categories of software and data used in the data processing system 405: the operating system 252; the application programs 254; the input/output (I/O) device drivers 258; and the data 256. The memory may also include a Rerucker and Derucker Run Mode Module 254*a*, with an optional braking run mode module as well. The modules can be automatic or configured to accept user input to select the operational sequence associated with the casing and/or horn type in use and/or to control certain operations of the components for automatic or semi-automatic operation. For example, the module 254*a* can accept proximity sensor data, pumping status, clipper status and the like.

In some embodiments, the module 254*a* is configured to allow a user to select certain parameters associated with a desired rerucking and/or derucking stroke cycle. For example, a user can select a desired repetition frequency (speed), repetition cycles per sleeve and/or per product, gripper contact force, stroke distance, and the like.

The data 256 may include a look-up chart of different casing run times (i.e., for a type of netting or edible casing formed in situ, as well as the product, the product filling rate, selectable product weight, length and the like corresponding to particular or target products for one or more producers). The data 256 may include data from a proximity sensor and/or exhaustion of casing or netting material detector that allows the computer program to automatically control the operation of the pumping apparatus to inhibit discharging product when casing material has been expended or during a clipping cycle.

As will be appreciated by those of skill in the art, the operating system 252 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 258 typically include software routines accessed through the operating system 252 by the application programs 254 to communicate with devices such as I/O data port(s), data storage 256 and certain memory 136 components. The application programs 254 are illustrative of the programs that implement the various features of the data processing system 405 and preferably include at least one application which supports operations according to embodiments of the present invention. Finally, the data 256 represents the static and dynamic data used by the application programs 254, the operating system 252, the I/O device drivers 258, and other software programs that may reside in the memory 136.

While the present invention is illustrated, for example, with reference to the Module 254a being an application program in FIG. 13, as will be appreciated by those of skill in the art, other configurations may also be utilized while still benefiting from the teachings of the present invention. For example, the Module 254a may also be incorporated into the operating system 252, the I/O device drivers 258 or other such logical division of the data processing system 405. Thus, the present invention should not be construed as limited to the configurations of FIG. 13, which is intended to encompass any configuration capable of carrying out the operations described herein.

The I/O data port can be used to transfer information between the data processing system 405 and certain components associated with the apparatus or mounted to the apparatus, which may use data from the HMI. The apparatus may have a common HMI or different controllers, and the system 405 can communicate with same, such as a controller associated with the voiding/clipping or closure attachment mechanism or another computer system or a network (e.g., the Internet) or to other devices controlled by the processor. These components may be conventional components such as those used in many conventional data processing systems which may be configured in accordance with the present invention to operate as described herein.

While the present invention is illustrated, for example, with reference to particular divisions of programs, functions and memories, the present invention should not be construed as limited to such logical divisions. Thus, the present invention should not be construed as limited to the configurations of FIG. 13 but is intended to encompass any configuration capable of carrying out the operations described herein.

The flowcharts and block diagrams of certain of the figures herein illustrate the architecture, functionality, and operation of possible implementations of selective implementation of single and dual clip closure means according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for facilitating the production of encased products, comprising:
   automatically rerucking netting in an upstream direction on a netting chute or horn proximate in time to a clipping operation carried out by a clipper that applies at least one clip to a leading end portion of a length of netting, wherein the rerucking comprises automatically directing at least one gripper to close against the netting chute or horn to pull a clipped end portion of the netting in an upstream direction so that the clipped end portion of the netting resides snugly stretched across an open channel at a discharge end of the chute and/or horn, wherein the at least one gripper comprises a pair of cooperating rerucker grippers that, during the rerucking step, close against opposing sides of the chute or horn and are configured to move axially rearward between about 1-24 inches while pressing the netting against an outer wall of the horn or chute, then, once the netting is stretched tight across the open channel at the discharge end of the horn or chute, the grippers stop rearward movement and apply less contact force so as to slip to allow netting to pull forward.

2. A method according to claim 1, wherein the rerucking pulls the clipped end portion in the upstream direction a sufficient distance so that the clipped end portion closes the open channel at the discharge end of the chute or horn with the at least one clip defining the clipped end portion residing substantially axially aligned with a centerline of the open channel and with the clipped end portion of the netting held stretched tight across the open channel to define a planar surface across the open channel at the discharge end of the chute or horn.

3. A method according to claim 1, wherein the clipper resides between about 1-3 inches downstream of the discharge end of the horn or chute, the method further comprising electronically synchronizing the rerucking step to be carried out within about 1 second to about 3 minutes after a clip is applied to the leading end portion of the netting.

4. A method according to claim 1, further comprising, after the rerucking step:
   automatically pulling netting off the netting chute or horn upon contact with food emulsion that is discharged from the chute or horn that is captured in the netting; and expanding the netting in response to a volume of the food emulsion thereby filling the netting to form a bulbous product shape.

5. A method according to claim 1, wherein the rerucking step is serially automatically repeated such that it is carried out prior to discharge of each successive quantity of product from the horn or chute.

6. A method according to claim 5, further comprising automatically derucking netting from the chute or horn by repeatedly drawing short lengths of a sleeve of netting material held on the netting chute forward at a discharge end portion of the netting chute out between some of the rerucking steps.

7. A method according to claim 1, further comprising synchronizing a telescoping conveyor residing downstream of the horn or chute to receive and convey away successive netting encased food emulsion products discharged from the horn and/or netting chute after each successive rerucking step.

8. A method according to claim 1, further comprising, after the rerucking step, automatically braking the netting material proximate the discharge end portion of the netting chute or horn to thereby control the tension of the netting upon contact with food emulsion that is discharged from the chute or horn that is captured in the netting and expanding the tensioned netting in response to a volume of the food emulsion thereby filling the netting to form a bulbous product shape.

9. A method according to claim 6, wherein the rerucking and derucking steps are performed with at least two separate pairs of grippers, one gripper of each pair of grippers residing adjacent each other on one side of the chute or horn and another gripper of each pair of grippers residing adjacent each other on another side of the chute or horn, with the rerucking and derucking grippers being configured to move axially in concert with each other about a portion of a length of the chute or horn during both the rerucking and derucking steps, but selectively move laterally inward so that only the rerucking grippers close against the chute or horn during the rerucking step and only the derucking grippers close against the chute or horn during the derucking step.

10. A method according to claim 6, wherein the rerucking and derucking steps are carried out using the same grippers, and wherein the grippers travel in a longitudinal direction about a length of the chute or horn and pivot inward to contact the chute or horn and pull netting in a desired direction to carry out the rerucking and derucking steps.

11. A method according to claim 6, wherein the derucking step is carried out using a pair of cooperating grippers that both contact the netting on the netting chute or horn to draw a length of the netting toward the end of the netting chute but are laterally spaced apart from the netting and the netting chute or horn during upstream movement, and wherein the pair of cooperating grippers travel in a longitudinal direction about a length of the chute or horn and pivot inward to contact the chute or horn and pull netting to carry out the derucking step.

12. A method according to claim 6, wherein the pair of rerucker grippers are slidably mounted to at least one horizontal slide residing above the chute or horn, and wherein the rerucking step is carried out by:
   directing a lateral actuation cylinder in communication with the pair of rerucker grippers to pivotably extend causing the rerucker grippers to close against the netting and the chute or horn; then
   directing an axial movement actuator to cause the pair of rerucker grippers to slide axially rearward on the horizontal slide.

13. A method according to claim 12, wherein the derucking step is carried out using a pair of derucking grippers mounted to the at least one horizontal slide, wherein the rerucking pair of grippers and the derucking pair of grippers are closely spaced and are configured to travel axially in concert during both the rerucking and derucking steps but the rerucking grippers laterally actuate independently of the derucking grippers to close against the chute or horn.

14. A method according to claim 6, wherein the rerucking step is carried out using a first pair of grippers and the derucking step is carried out using a second different pair of grippers and wherein one gripper of each pair of grippers resides on a first lateral side of the product chute closely spaced together and another gripper of each gripper pair resides on an opposing lateral side of the product chute closely spaced together, and wherein the first pair of rerucking grippers reside downstream of the second pair of derucking grippers, and wherein the first and second pairs of grippers travel axially in concert during both the rerucking and derucking steps.

15. A method for facilitating the production of encased products, comprising:
   automatically rerucking netting in an upstream direction on a netting chute or horn having an open channel proximate in time to a clipping operation carried out by a clipper that applies at least one clip to a leading end portion of a length of netting, wherein the rerucking comprises automatically directing at least one gripper to close against the netting chute or horn and then move rearward to pull the clipped end portion of the netting in an upstream direction so that the clipped end portion of the netting is held stretched tight against the discharge end of the chute or horn to define a planar surface across an opening of the channel of the discharge end of the chute or horn with the clip of the clipped end portion residing aligned with an axially extending center line of the horn or chute.

16. The method of claim 15, wherein the clipper is positioned between about 1-3 inches from the discharge end of the chute or horn, and wherein the netting is elastic and configured to stretch more in a radial direction than in an axial direction, the method comprising serially forming bulbous food products after respective rerucking steps.

17. A method for facilitating the production of encased products, comprising:
   automatically rerucking netting in an upstream direction on a netting chute or horn having an open channel proximate in time to a clipping operation carried out by a clipper that applies at least one clip to a leading end portion of a length of netting, the rerucking comprises automatically directing at least one gripper to close against the netting chute or horn to pull the clipped end portion of the netting in an upstream direction so that the clipped end portion of the netting is held stretched tight against the discharge end of the chute or horn to define a planar surface across an opening of the channel of the discharge end of the chute or horn with the clip of the clipped end portion residing aligned with an axially extending center line of the horn or chute,
   wherein the rerucking step is carried out using a first pair of cooperating grippers that pivot inward in concert to close against opposing sides of the chute or horn, then travel axially rearward between about 1-24 inches while pressing the netting against an outer wall of the horn or chute until the clipped end portion of the netting is stretched tight across the opening of the horn or chute channel.

18. A method according to claim 17, wherein, during the rerucking step, once the clipped end portion of the netting is stretched tight across the horn or chute opening, the first pair of grippers stop rearward movement and apply less contact force so as to allow netting to pull forward during the remainder of a rerucker stroke cycle but still apply a braking force.

19. A method according to claim 15, further comprising synchronizing a telescoping conveyor residing downstream of the horn or chute to receive and convey away successive netting encased food emulsion products discharged from the horn and/or netting chute after each successive rerucking step.

20. A method according to claim 15, further comprising, after the rerucking step, automatically braking the netting material proximate the discharge end portion of the netting chute or horn to thereby control the tension of the netting upon contact with food emulsion that is discharged from the chute or horn that is captured in the netting and expanding the tensioned netting in response to a volume of the food emulsion thereby filling the netting to form a bulbous product shape.

21. A method according to claim 17, wherein the rerucking step is repeated proximate in time to discharge of a product from the chute or horn, and wherein the method further comprises derucking netting from the chute or horn after some of the rerucking steps, wherein the derucking step is carried out using a second pair of cooperating grippers that travel axially in concert with the first pair of grippers during both the rerucking and derucking steps, and wherein the first pair of rerucking grippers reside downstream of the second pair of derucking grippers and each pair of grippers pivotably extend inward independently of the other pair such that only the derucking grippers contact the chute or horn during the derucking step and only the rerucking grippers contact the chute or horn during the rerucking step.

22. A method for facilitating the production of encased products, comprising:

providing a rerucking and derucking mechanism with two pair of grippers, a first rerucking pair of grippers and a second derucking pair of grippers, each having a respective first gripper on a first side of a chute or horn closely spaced to each other and a respective second gripper on an opposing second side of the chute or horn closely spaced to each other, wherein the two pair of grippers travel in concert in a longitudinal direction about a length of the chute, and wherein each gripper of each gripper pair controllably pivotably extends inward to close against the netting chute or horn;

automatically rerucking netting held on the netting chute or horn in an upstream direction onto the netting chute or horn proximate in time to a clipping operation carried out by a clipper that applies at least one clip to a leading end portion of a length of the netting, wherein the rerucking comprises automatically directing the first rerucking grippers to pivot inward and close against the netting chute or horn at a location proximate the discharge end of the netting chute or horn while the derucking grippers remain spaced apart from the netting chute or horn; then pulling a clipped end portion of the netting in an upstream direction in response to the rerucking step so that the clipped end portion of the netting resides stretched across an open channel at the discharge end of the netting chute and/or horn.

23. The method of claim 22, wherein the rerucker grippers are closer to the discharge end of the product chute than the derucker grippers.

24. The method of claim 22, further comprising electronically monitoring force or pressure and electronically controlling when to stop the pulling step based on the monitored force or pressure.

\* \* \* \* \*